(12) United States Patent
Hoshino et al.

(10) Patent No.: US 8,234,775 B2
(45) Date of Patent: Aug. 7, 2012

(54) METHOD FOR MANUFACTURING LAMINATED ROTOR CORE

(75) Inventors: Akinori Hoshino, Nisshin (JP); Haruji Suzuki, Kariya (JP); Shusaku Kamio, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 816 days.

(21) Appl. No.: 12/037,988

(22) Filed: Feb. 27, 2008

(65) Prior Publication Data

US 2008/0201936 A1  Aug. 28, 2008

(30) Foreign Application Priority Data

Feb. 28, 2007 (JP) ................................. 2007-048529

(51) Int. Cl.
*H02K 15/10* (2006.01)
(52) U.S. Cl. ................ 29/598; 29/596; 29/605; 29/609; 310/216.001
(58) Field of Classification Search ............ 29/596, 29/598, 605, 609; 310/216
See application file for complete search history.

(56) References Cited

U.S. PATENT DOCUMENTS

| | | | | |
|---|---|---|---|---|
| 4,395,815 A | * | 8/1983 | Stanley et al. | 29/598 |
| 4,438,558 A | * | 3/1984 | Mitsui | 29/732 |
| 6,806,615 B2 | * | 10/2004 | Enomoto et al. | 310/216.096 |
| 7,067,952 B2 | * | 6/2006 | Neal | 310/254.1 |
| 7,667,367 B2 | * | 2/2010 | Matsuo et al. | 310/216.004 |
| 7,698,803 B2 | * | 4/2010 | Mitsui et al. | 29/596 |
| 2004/0124734 A1 | * | 7/2004 | Liao | 310/218 |

FOREIGN PATENT DOCUMENTS

| | | | |
|---|---|---|---|
| JP | 57-156657 A | | 9/1982 |
| JP | 6-217501 A | | 8/1994 |
| JP | 7-99745 A | | 4/1995 |
| JP | 2005-20972 A | | 1/2005 |
| JP | 2006-26662 A | | 2/2006 |
| JP | 2006-166498 A | | 6/2006 |
| JP | 2005-031946 | * | 8/2006 |
| JP | 2006-223022 A | | 8/2006 |

OTHER PUBLICATIONS

Office Action issued Mar. 6, 2012 by the Japanese Patent Office in Japanese Patent Application No. 2007-048529 and English translation of Office Action.

* cited by examiner

*Primary Examiner* — Carl Arbes
(74) *Attorney, Agent, or Firm* — Buchanan Ingersoll & Rooney PC

(57) ABSTRACT

A method for manufacturing a laminated rotor core includes a punching process for punching a strip-shaped material to make a core piece, a placing process, which is performed simultaneously with the punching process of the core piece, for placing the core piece in a die so that the core piece is placed on another core piece previously punched and placed in the die and a joining process for joining the core pieces.

16 Claims, 5 Drawing Sheets

METHOD FOR MANUFACTURING LAMINATED ROTOR CORE

CROSS REFERENCE TO RELATED APPLICATIONS

This application is based on and claims priority under 35 U.S.C. §119 to Japanese Patent Application 2007-048529, filed on Feb. 28, 2007, the entire content of which is incorporated herein by reference.

FIELD OF THE INVENTION

This invention generally relates to a method for manufacturing a laminated rotor core.

BACKGROUND

JP2006-166498A describes a known manufacturing method of a laminated rotor iron core. According to JP2006-166498A, the manufacturing method of the laminated rotor iron core includes a process for pressing a metal plate and forming a belt iron core pieces and a process for spirally wrapping and laminating the belt iron core pieces and mutually caulking and coupling the laminated belt iron core pieces. The belt iron core pieces have a shape of the laminated rotor iron core linearly developed. The belt iron core pieces have a cutout formed at a side edge corresponding to an inner circumference at a predetermined interval. The circular side edge corresponding to the inner circumference between the adjacent cutouts corresponds to an inner circumference of a shaft hole. The belt iron core pieces have a magnet mounting hole or a diecast metal filing hole formed in the middle in the width direction at the predetermined interval. A side edge corresponding to an outer circumference of the belt iron core pieces are locally pressed and expanded when the belt iron core pieces are spirally wrapped. When the belt iron core pieces are spirally wrapped, because the cutout is formed at the predetermined interval, the side edge corresponding to the inner circumference can be bended without exerting plate compressive force on the side edge corresponding to the inner circumference and the belt iron core pieces can be wrapped to a circular shape.

However, according to the known manufacturing method of the laminated rotor iron core described in JP2006-166498A, because the belt iron core pieces are locally pressed and expanded when the belt iron core pieces are spirally wrapped and laminated, partial deformation and embossment tend to be formed when an outer circumferential side of the belt iron core pieces is bended and ensuring precision tends to be difficult. Further, for minimizing the deformation of the outer circumferential side of the belt iron core pieces, the belt iron core pieces need a large cutout and a complex shape with consideration to the deformation. However, the large cutout and the complex shape of the belt iron core pieces tend to cause low yield rate of the belt iron core pieces (material of the laminated rotor iron core) and large and expensive punch die set for forming the belt iron core pieces. Further, other than the punch die set, a loading device for loading the belt iron core pieces and a wrapping unit for wrapping and laminating the belt iron core pieces are separately needed for spirally wrapping and laminating the belt iron core pieces.

A need thus exists for a method for manufacturing a laminated rotor core which is not susceptible to the drawback mentioned above.

SUMMARY OF THE INVENTION

According to an aspect of the present invention, a method for manufacturing a laminated rotor core includes a punching process for punching a strip-shaped material to make a core piece, a placing process, which is performed simultaneously with the punching process of the core piece, for placing the core piece in a die so that the core piece is placed on another core piece previously punched and placed in the die and a joining process for joining the core pieces.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
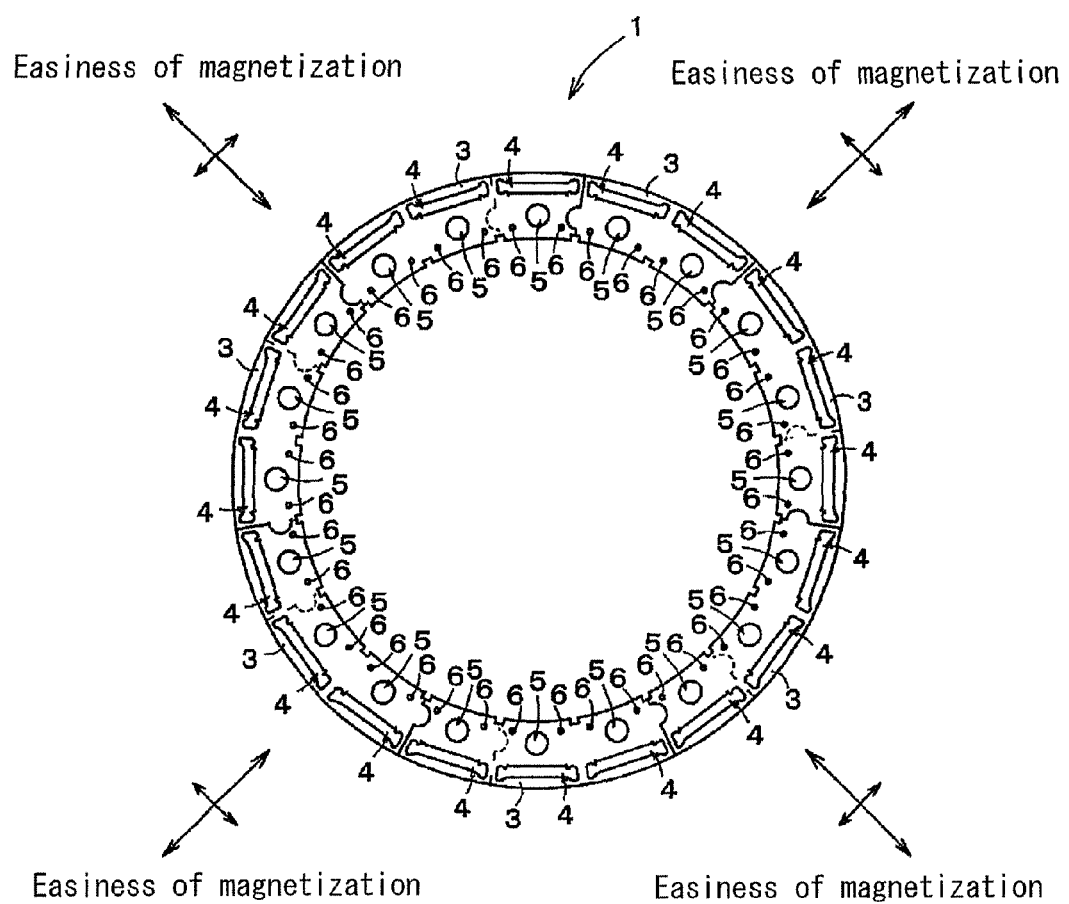
FIG. 1 represents a plane view illustrating a laminated rotor core according to an embodiment of the present invention.

An embodiment of the present invention will be explained with reference to drawing figures. FIG. 1 represents a plane view illustrating a laminated rotor core 1 according to the embodiment of the present invention.

The laminated rotor core 1 illustrated in FIG. 1 includes plural arc-shaped core pieces 3 continuously placed in a circumferential direction and coiled to make a spiral shape. In the embodiment of the present invention, the core pieces 3 have the same size and shape.

Specifically, the core piece 3 illustrated in FIG. 1 includes permanent magnet installation holes 4 for accommodating a permanent magnet, through-holes 5 for installing a sleeve (not illustrated), and embossed portions 6 made by half die cutting for riveting the core pieces 3 together while the core pieces 3 are laminated. In the embodiment of the present invention, three permanent magnet installation holes 4 are provided in the core piece 3 at regular intervals. Further, three through-holes 5 are provided in the core piece 3 at regular intervals. Further, the embossed portions 6 are positioned at both sides of the through-hole 5. An easy magnetization direction of the laminated rotor core 1 corresponds to a radial direction from a center of a circumference of the laminated rotor core 1 (predetermined direction).

Further, the core pieces 3 adjacent to each other in a laminating direction are displaced from each other in the circumferential direction as illustrated by a dashed line in FIG. 1. Specifically, the core pieces 3 adjacent to each other are displaced from each other by two thirds of an arc length of the core piece 3. In the meantime, a size and a shape of the core piece 3, a displacement between the core pieces 3 adjacent to each other, a shape and a position of the through-hole 5, a shape and a position of the permanent magnet installation hole 4 and a shape and a position of the embossed portion 6 are not particularly limited to the configuration described above.

Figure 2:
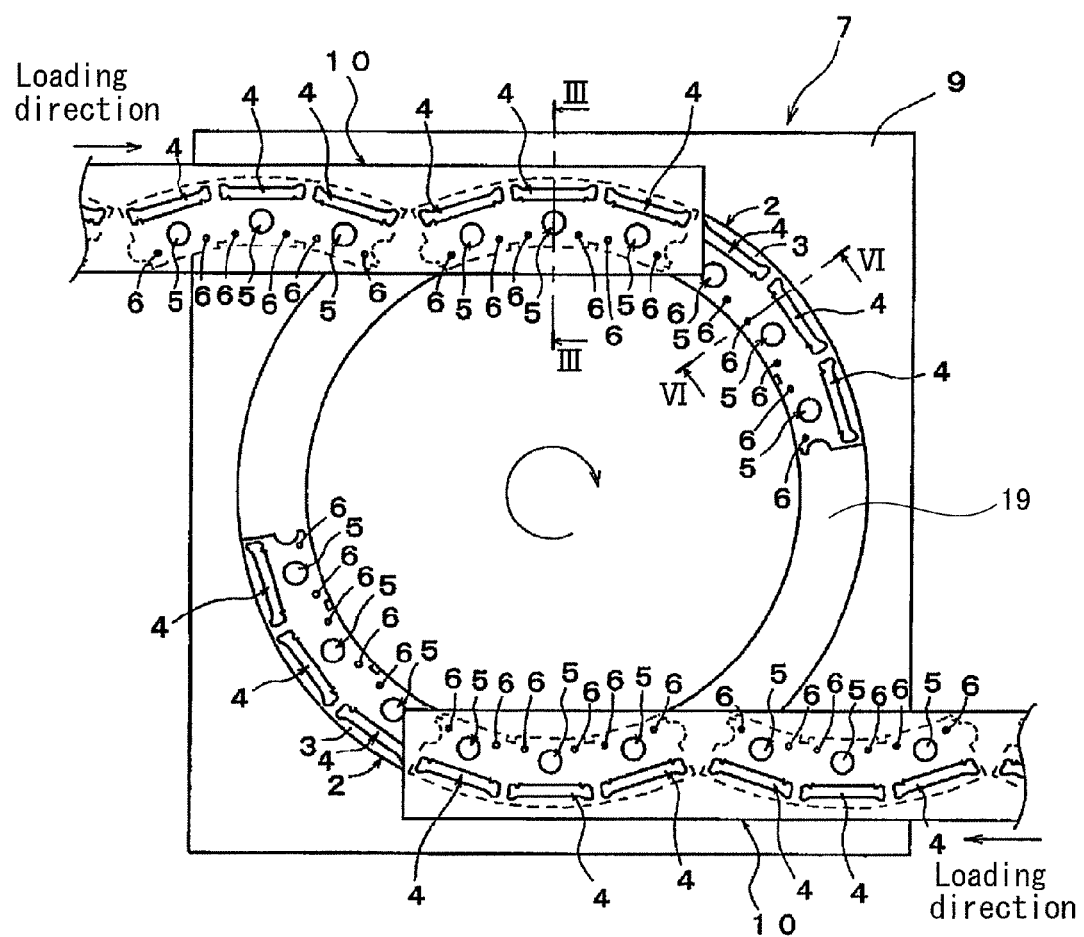
FIG. 2 represents a plane view illustrating a punch die set utilized in a method for manufacturing the laminated rotor core according to the embodiment of the present invention.

FIG. 2 represents a plane view illustrating a punch die set 7 utilized in a method for manufacturing the laminated rotor core 1 according to the embodiment of the present invention. The punch die set 7 includes a punch 8 (illustrated in FIG. 3) for punching a grain-oriented electrical steel sheet 10 (strip-shaped material) to make the core piece 3 and a die 9, in which the core piece 3 made by punching is placed. The die 9 can be rotated by a motor (not illustrated). Two strips of the grain-oriented electrical steel sheet 10 are loaded to the punch die set 7 by a loading device (not illustrated). The permanent magnet installation holes 4 for accommodating the permanent magnet, the through-holes 5 for installing the sleeve (not illustrated), and the embossed portions 6 for riveting the core pieces 3 while the core pieces 3 are laminated are preliminarily provided in the grain-oriented electrical steel sheet 10.

Figure 3:
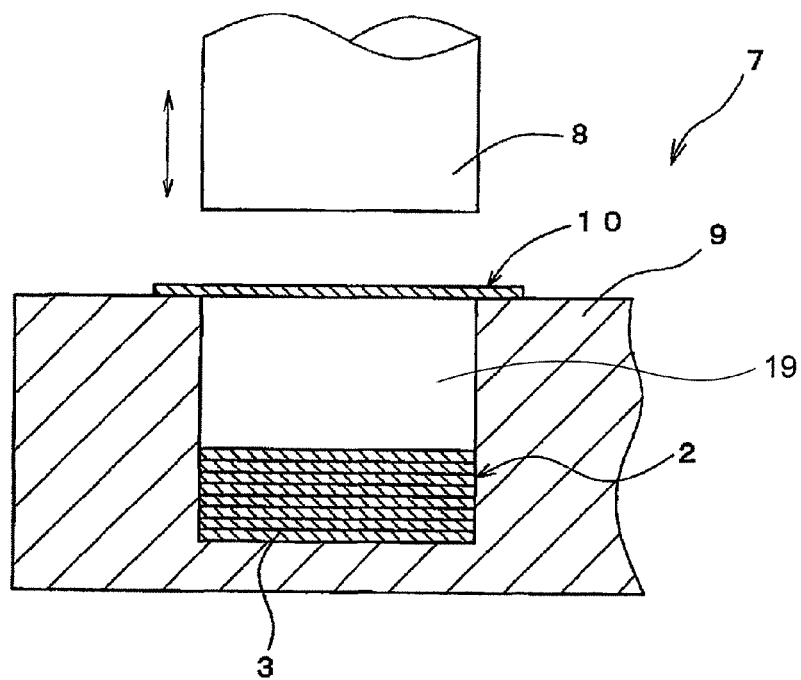
FIG. 3 represents a cross-sectional view taken along line III-III in FIG. 2 illustrating the punch die set utilized in the method for manufacturing the laminated rotor core according to the embodiment of the present invention.

FIG. 3 represents a cross-sectional view taken along line 111-111 in FIG. 2 illustrating the punch die set 7 utilized in the method for manufacturing the laminated rotor core 1 according to the embodiment of the present invention. In the embodiment of the present invention, the punch die set 7 includes the punch 8 having an arc-shaped punch surface and the die 9 having a ring-shaped die hole 19. The grain-oriented electrical steel sheet 10 is loaded to area between the punch 8 and the die 9. The core piece 3 made by punching the grain-oriented electrical steel sheet 10 by the punch 8 is placed in the die 9.

Figure 4:
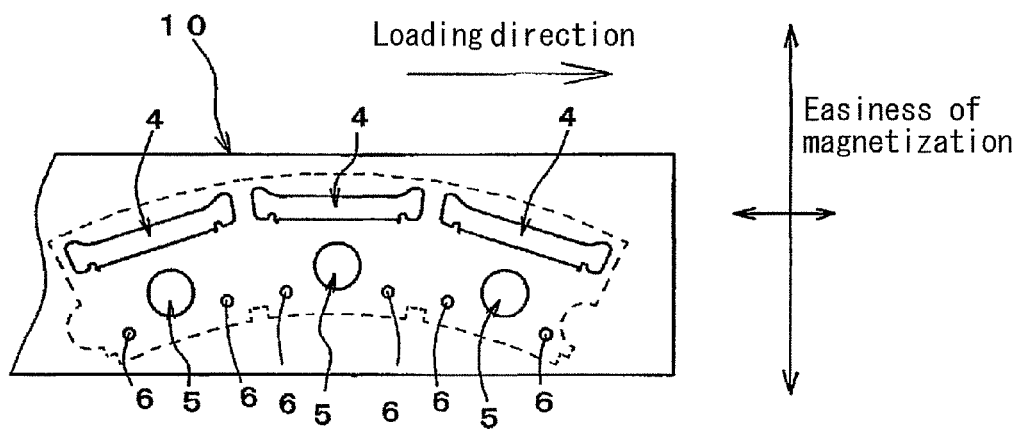
FIG. 4 represents a diagram illustrating an easy magnetization direction of a grain-oriented electrical steel sheet.

FIG. 4 represents a diagram illustrating the easy magnetization direction of the grain-oriented electrical steel sheet 10. In FIG. 4, a length of an arrow indicates a degree of easiness of magnetization of the grain-oriented electrical steel sheet 10. In other words, a longer arrow in FIG. 4 indicates the easy magnetization direction of the grain-oriented electrical steel sheet 10. The grain-oriented electrical steel sheet 10 is loaded so that the easy magnetization direction is constant. Then, the grain-oriented electrical steel sheet 10 is punched by the punch 8. Accordingly, the core piece 3 is placed in the die 9 so that the easy magnetization direction of the core piece 3 is identical. The easy magnetization direction is set so that the degree of easiness of magnetization becomes high in the radial direction from the center of the circumference of the laminated rotor core 1 (FIG. 1). The grain-oriented electrical steel sheet 10 is loaded to the punch die set 7 by one unit length of the core piece 3 and punched.

Figure 5:
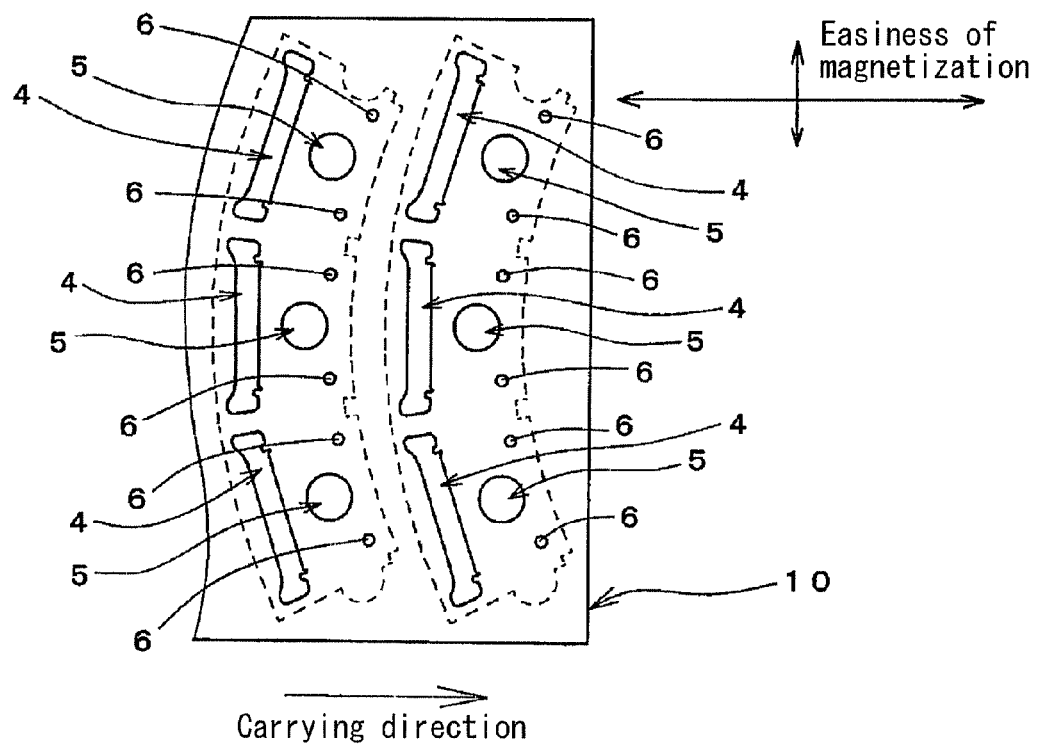
FIG. 5 represents a diagram illustrating a situation, in which the easy magnetization direction of the grain-oriented electrical steel sheet is different from that illustrated in FIG. 4.

FIG. 5 represents a diagram illustrating a situation, in which the easy magnetization direction of the grain-oriented electrical steel sheet 10 is different from that illustrated in FIG. 4. In this situation, a direction for punching the grain-oriented electrical steel sheet 10 to make the core piece 3 is changed so that the degree of easiness of magnetization becomes high in the radial direction from the center of the circumference of the laminated rotor core 1.

Figure 6:
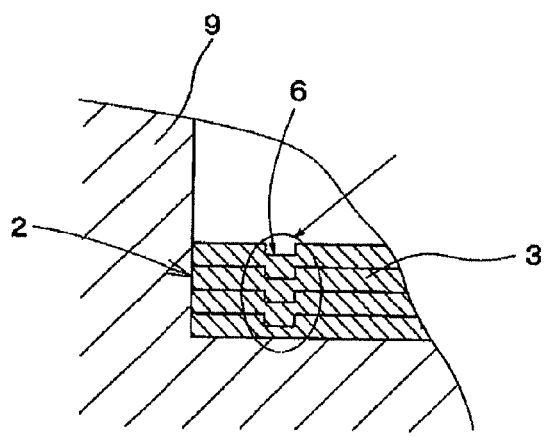
FIG. 6 represents an enlarged cross-sectional view taken along line VI-VI in FIG. 2 typically illustrating a rivet portion of a laminated core piece.
Figure 7:
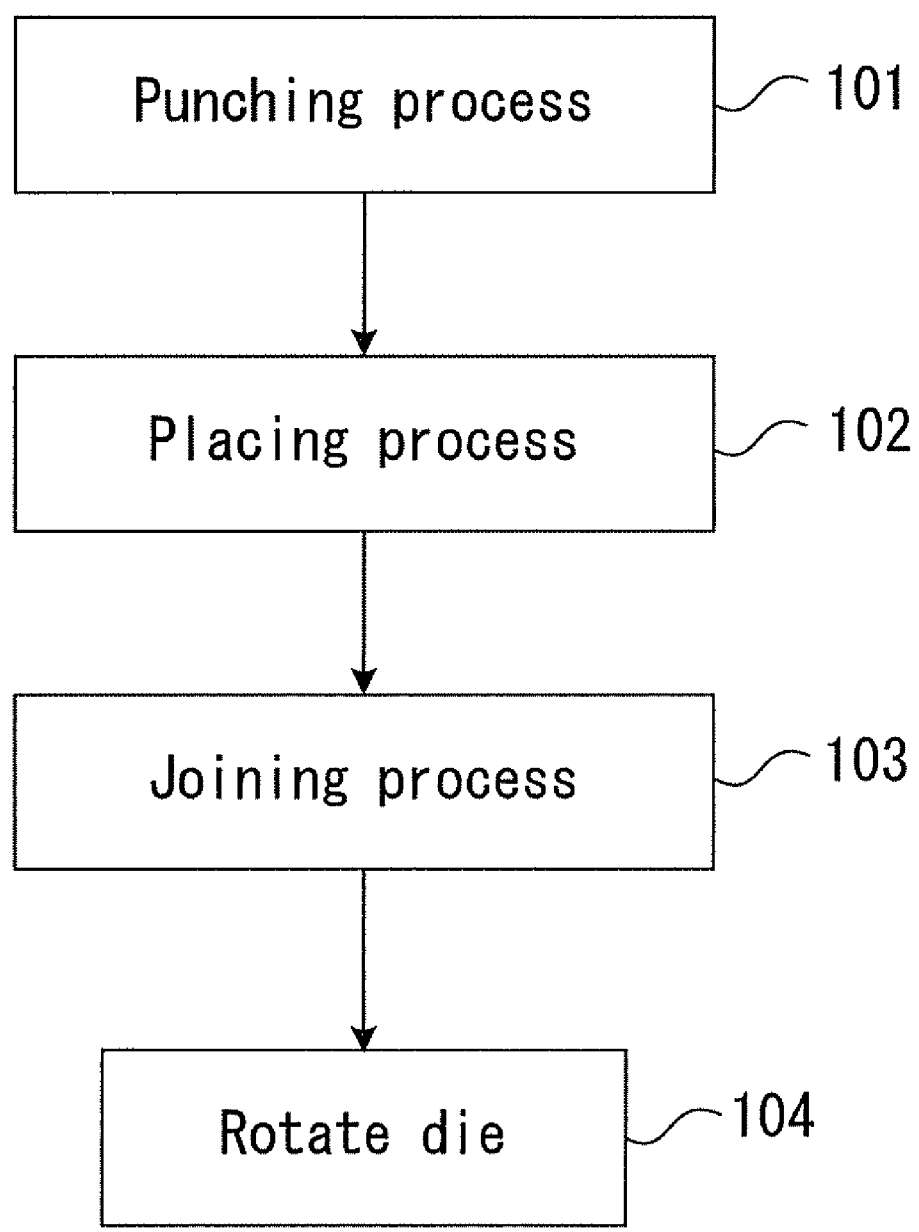
FIG. 7 represents a flowchart schematically illustrating the method for manufacturing the laminated rotor core according to the embodiment of the present invention.

FIG. 6 represents an enlarged cross-sectional view taken along line VI-VI in FIG. 2 typically illustrating a rivet portion of the laminated core piece 3. The embossed portion 6 provided on a surface of the core piece 3 is riveted with another embossed portion 6 made by half die cutting provided on a surface of another core piece 3 adjacent to the core piece 3. The embossed portion 6 is riveted with the other embossed portion 6 adjacent to the embossed portion 6 in the die 9. Thus, the laminated core pieces 3 become a unit of a laminated core 2. Next, processes of the method for manufacturing the laminated rotor core 1 according to the embodiment of the present invention will be explained with reference to FIG. 7. FIG. 7 represents a flowchart schematically illustrating the method for manufacturing the laminated rotor core 1 according to the embodiment of the present invention.

(Punching process 101) The grain-oriented electrical steel sheet 10 is loaded to a predetermined position of the punch die set 7. At the time when the grain-oriented electrical steel sheet 10 reaches the predetermined position, the punch 8 moves toward the die 9 and punches the grain-oriented electrical steel sheet 10 to cut out a shape of the core piece 3. At this time, the grain-oriented electrical steel sheet 10 is loaded to the punch die set 7 so that the degree of easiness of magnetization becomes high in the radial direction from the center of the circumference of the laminated rotor core 1. In other words, the easy magnetization direction of the grain-oriented electrical steel sheet 10 corresponds to the radial direction from the center of the circumference of the laminated rotor core 1 (predetermined direction). The two strips of the grain-oriented electrical steel sheet 10 are loaded to the punch die set 7. Each strip of the grain-oriented electrical steel sheet 10 is punched by each punch 8 simultaneously.

(Placing process 102) The core piece 3, which is made by the punching process 101 performed by the punch 8, is pushed into the die 9 by the punch 8 until the core piece 3 contacts with the core piece 3, which is previously punched and placed. In other words, the placing process 102 is performed simultaneously with the punching process 101 of the core piece 3. At this time, because the core piece 3 made by the punching process 101 is guided by the die 9, high positional precision can be obtained.

(Joining process 103) In the embodiment of the present invention, the placed core pieces 3 are joined in the die 9. Specifically, the embossed portion 6, which is provided on the surface of the core piece 3 placed in the die 9, is fitted with the embossed portion 6, which is provided on the surface of the core piece 3 previously placed in the die 9. Then, the placed core piece 3 is pressed by the punch 8. Thus, the core pieces 3 are riveted together through the embossed portions 6. In the meantime, instead of the joining process 103 described above, the core pieces 3 can be joined together with use of a laser, or the like, after the laminated rotor core 1, which has been processed by the punching process 101 and the placing process 102, is removed from the die 9.

In the embodiment of the present invention, the punch 8 moves in an opposite direction from the die 9 after the punching process 101, the placing process 102 and the joining process 103. Then, the punching process 101, or the like, for the next core piece 3 is started. The punching process 101, the placing process 102 and the joining process 103 for the next core piece 3 are performed after the die 9 is rotated (for example, rotated clockwise) by an angle corresponding to one core piece 3 (104 in FIG. 7). Because the core pieces 3 are laminated while the die 9 is rotated as described above, the core pieces 3 are coiled into the spiral shape. Further, in the embodiment of the present invention, the core pieces 3 adjacent to each other in the laminating direction are laminated so that the core pieces 3 adjacent to each other in the laminating direction are displaced from each other in the circumferential direction. Specifically, the core pieces 3 adjacent to each other in the laminating direction are laminated so that the core pieces 3 adjacent to each other in the laminating direction are displaced by two thirds of the arc length of the core piece 3. The punching process 101, the placing process 102 and the joining process 103 are repeated while the die 9 is rotated. By doing so, the core pieces 3 are laminated into the spiral shape and the laminated rotor core 1 is thus formed. The punching process 101, the placing process 102 and the joining process 103 are repeated until a predetermined number of the core pieces 3 are laminated. As described above, because the core pieces 3 are placed while the core pieces 3 are guided by the die 9, high positional precision can be obtained.

According to the embodiment of the present invention, the method for manufacturing the laminated rotor core 1 includes the punching process 101 for punching the grain-oriented electrical steel sheet 10 to make the core piece 3 and the placing process 102 for placing the core piece 3 made by the punching process 101. Accordingly, excessive bending stress is not exerted to the core piece 3. Therefore, a deformation and an embossment of the core piece 3 can be prevented.

Further, because the method for manufacturing the laminated rotor core 1 includes the joining process 103 for riveting the laminated core pieces 3 in the die 9, the laminated rotor core 1 of high precision can be obtained.

Further, because the embossed portion 6, which is provided on the surface of the core piece 3, is riveted with the embossed portion 6, which is provided on the surface of the core piece 3 adjacent to the core piece 3 in the die 9, the laminated rotor core 1 of high precision can be obtained.

Further, in comparison with the known method where the belt iron core pieces are formed by pressing and after that the belt iron core pieces are spirally wrapped, because a separate wrapping process is not needed in the embodiment of the present invention, productivity can be improved. Further, in the known method, separate units are needed for loading and wrapping. However, according to the embodiment of the present invention, a separate wrapping unit is not needed. Accordingly, downsizing of a device (punching die set 7) is possible.

Further, the known belt iron core pieces have the large cutout for spirally wrapping and laminating the belt iron core pieces. Further, the known belt iron core pieces have the complex shape because a deformation at the time of wrapping and laminating is considered. In contrast, according to the embodiment of the present invention, a cutout is not needed in the core piece 3 of the laminated rotor core 1. Further, a complex shape designed with consideration to a deformation of the core piece 3 is not needed. Accordingly, a yield rate of the laminated rotor core 1 according to the embodiment of the present invention can be better than that of the known one.

Further, a production speed of the laminated rotor core 1 can be doubled because the two strips of the grain-oriented electrical steel sheet 10 are punched to make core pieces 3.

Further, because the grain-oriented electrical steel sheet 10 is punched to make the core piece 3 and the core piece 3 is placed so that the degree of easiness of magnetization becomes high in the radial direction from the center of the circumference of the laminated rotor core 1 (FIG. 1), in comparison with the known method, in which a non-oriented electrical steel sheet is utilized, magnetization of the laminated core 2 can have directionality. In the embodiment of the present invention, a maximum torque can be improved by 4.6%.

Further, according to the embodiment of the present invention, because the core pieces 3 made by punching are placed in the die 9 in the circumferential direction, the laminated rotor core 1 of high precision can be obtained.

Further, because the die 9 is rotated and the laminated core 2 is placed in the die 9 in the circumferential direction, the laminated rotor core 1 of high precision can be obtained.

In the embodiment of the present invention, in the joining process 103, the embossed portion 6 provided on the surface of the core piece 3 is riveted with the embossed portion 6 provided on the surface of the core piece 3 adjacent to the core piece 3. However, a method for joining is not limited to riveting. Other methods, for example, laser joining, or the like, can be employed.

Further, in the embodiment of the present invention, the punching process 101 is performed for the two strips of the grain-oriented electrical steel sheet 10. However, the number of strips, for which the punching process 101 is performed, is not limited to the number described above. The punching process 101 can be performed for three or more strips of the grain-oriented electrical steel sheet 10. The production speed of the laminated rotor core 1 can be improved as the number of strips of the grain-oriented electrical steel sheet 10 increases.

The laminated rotor core 1 can be utilized for a generator, an electric motor, or the like.

According to the embodiment of the present invention, the method for manufacturing the laminated rotor core 1 includes the punching process 101 for punching the strip-shaped material 10 to make the core piece 3 and the placing process 102 for placing the core piece 3 simultaneously with the punching process 101. Accordingly, not like the known method, excessive bending stress is not exerted to the core piece 3. Therefore, a deformation and an embossment of the core piece 3 can be prevented. Further, because the core piece 3 made by the punching process 101 is placed in the die 9, the laminated rotor core 1 of high precision can be obtained.

According to the embodiment of the present invention, in comparison with the known method where the belt iron core pieces are formed by pressing and after that the belt iron core pieces are spirally wrapped, because a separate process for spirally wrapping the belt iron core pieces does not exist in the embodiment of the present invention, the productivity of the laminated rotor core 1 can be improved. Further, according to the embodiment of the present invention, because the separate wrapping unit is not needed, downsizing of the device is possible. Further, the known belt iron core pieces need the large cutout for spirally wrapping and laminating the belt iron core pieces and the complex shape with consideration to the deformation. In contrast, according to the embodiment of the present invention, the core piece 3 does not need a cutout and a complex shape with consideration to a deformation. Accordingly, the yield rate can be higher than that of the known one.

According to the embodiment of the present invention, the placed core pieces 3 are joined in the die 9 in the joining process 103. Accordingly, the laminated rotor core 1 of high precision can be obtained. Further, collapse of the laminated rotor core 1 after the laminated rotor core 1 is removed from the die 9 can be prevented.

According to the embodiment of the present invention, the embossed portion 6, which is made by half die cutting and which is provided on the surface of the core piece 3, is riveted with the embossed portion 6, which is made by half die cutting and which is provided on the surface of the core piece 3 adjacent to the core piece 3 in the laminating direction. Accordingly, the laminated rotor core 1 of higher precision can be obtained.

According to the embodiment of the present invention, two or more strips of the strip-shaped material 10 are punched to make two or more core pieces 3 in the punching process 101. According to the embodiment of the present invention, a production speed of the laminated core 2 can be doubled when the two strips of the strip-shaped material 10 are punched to make the core pieces 3. Similarly, the production speed of the laminated core 2 can be tripled when three strips of the strip-shaped material 10 are punched to make the core pieces 3. The production speed of the laminated core 2 can be n times when n strips of the strip-shaped material 10 are punched to make the core pieces 3.

According to the embodiment of the present invention, the strip-shaped material 10 is the grain-oriented electrical steel sheet 10 and the grain-oriented electrical steel sheet 10 is punched so that the easy magnetization direction of the grain-oriented electrical steel sheet 10 corresponds to the predetermined direction. Accordingly, in comparison with the known method, in which the non-oriented electrical steel sheet is utilized, magnetization of the laminated core 2 can have directionality. Therefore, performance of a generator, an electric motor, or the like, can be improved.

According to the embodiment of the present invention, the core piece 3 made by the punching process 101 is placed in the die 9 in the placing process 102 so that the core pieces 3 are placed in the circumferential direction. Accordingly, the laminated rotor core 1 of high precision can be obtained.

According to the embodiment of the present invention, the die 9 is rotated and the core piece 3 is placed in the placing process 102 so that the core pieces 3 are placed in the circumferential direction. Accordingly, the laminated rotor core 1 of high precision can be obtained.

According to the embodiment of the present invention, the core pieces 3 adjacent each other in the laminating direction are displaced from each other in the circumferential direction. Accordingly, the laminated rotor core 1 of high strength can be obtained.

According to the embodiment of the present invention, the punching process 101 and the placing process 102 are performed with use of the die 9 having the ring-shaped die hole 19.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for manufacturing an annular-shaped laminated rotor core, the method comprising:
    punching a strip-shaped material to produce a punched-out arc-shaped core piece which is punched-out from the strip-shaped material;
    placing the punched-out arc-shaped core piece in a die;
    rotating the die relative to the strip-shaped material; and
    repeating the punching of the strip-shaped material, the placing of the punched-out arc-shaped core piece in the die, and the rotating of the die relative to the strip-shaped material to position subsequent punched-out arc-shaped core pieces in the die adjacent each other in a circumferential direction and in a laminating direction, and so that the core pieces are coiled into a spiral shape.

2. The method for manufacturing the annular-shaped laminated rotor core according to claim 1, wherein the punched-out arc-shaped core pieces which are adjacent in the laminating direction are joined together in the die.

3. The method for manufacturing the annular-shaped laminated rotor core according to claim 2, wherein the joining together comprises fitting an embossed portion on a surface of one of the punched-out arc-shaped core pieces into an embossed portion on a surface of the punched-out arc-shaped core piece which is adjacent the one punched-out arc-shaped core piece in the laminating direction, and so that the core pieces are coiled into a spiral shape.

4. The method for manufacturing the annular-shaped laminated rotor core according to claim 1, wherein the punching comprises punching two or more strips of the strip-shaped material are punched simultaneously by a punch to simultaneously produce two of the punched-out arc-shaped core pieces.

5. The method for manufacturing the annular-shaped laminated rotor core according to claim 1, wherein the strip-shaped material is a grain-oriented electrical steel sheet and the grain-oriented electrical steel sheet is punched so that an easy magnetization direction of the grain-oriented electrical steel sheet corresponds to a predetermined direction.

6. The method for manufacturing the annular-shaped laminated rotor core according to claim 1, wherein the die is rotated to circumferentially offset the punched-out arc-shaped core pieces relative to the punched-out arc-shaped core pieces which are adjacent in the laminating direction.

7. The method for manufacturing the annular-shaped laminated rotor core according to claim 1, wherein the punching of the strip-shaped material and the placing of the punched-out arc-shaped core piece in the die are performed using a punch and the die which has a ring-shaped die hole.

8. The method for manufacturing the annular-shaped laminated rotor core according to claim 1, wherein each arc-shaped core piece includes a magnet installation through hole configured to accommodate a magnet, a sleeve installation through hole configured to install a sleeve, and an embossed portion, the method further comprising fitting the embossed portion on a surface of one of the punched-out arc-shaped core pieces into the embossed portion on a surface of the punched-out arc-shaped core piece which is adjacent the one punched-out arc- shaped core piece in the laminating direction.

9. A method for manufacturing an annular-shaped laminated rotor core, the method comprising:
    positioning a strip-shaped material adjacent a die;
    punching the strip-shaped material a plurality of times to produce a plurality of first punched-out arc-shaped core pieces and pushing each of the first punched-out arc-shaped core pieces into the die to position the first punched-out arc-shaped core pieces adjacent one another in a circumferentially direction; and
    further punching the strip-shaped material a plurality of times to produce a plurality of second punched-out arc-shaped core pieces and pushing each of the second punched-out arc-shaped core pieces into the die to position the second punched-out arc-shaped core pieces adjacent one another in the circumferentially direction and to position the second punched-out arc-shaped core pieces adjacent the first punched-out arc-shaped core pieces in a laminating direction so that the first and second punched-out arc-shaped core pieces are coiled into a spiral shape.

10. The method for manufacturing the annular-shaped laminated rotor core according to claim 9, wherein the second punched-out arc-shaped core pieces which are adjacent the first punched-out arc-shaped core pieces in the laminating direction are joined together in the die.

11. The method for manufacturing the annular-shaped laminated rotor core according to claim 10, wherein the joining together comprises fitting an embossed portion on a surface of one of each of the first punched-out arc-shaped core pieces into an embossed portion on a surface of one of the second punched-out arc-shaped core pieces.

12. The method for manufacturing the annular-shaped laminated rotor core according to claim 9, wherein the positioning of the strip-shaped material adjacent the die comprises positioning at least two strip-shaped materials adjacent the die, and wherein the punching of the strip-shaped material a plurality of times to produce the first punched-out arc-shaped core pieces comprises simultaneously punching the at least two strips of the strip-shaped material.

13. The method for manufacturing the annular-shaped laminated rotor core according to claim 9, wherein the strip-shaped material is a grain-oriented electrical steel sheet and the grain-oriented electrical steel sheet is punched so that an easy magnetization direction of the grain-oriented electrical steel sheet corresponds to a predetermined direction.

14. The method for manufacturing the annular-shaped laminated rotor core according to claim 9, wherein the strip-shaped material is punched by a punch, and wherein the die is rotated after each punch of the strip-shaped material.

15. The method for manufacturing the annular-shaped laminated rotor core according to claim 9, wherein the strip-shaped material is punched by a punch, and wherein the die is rotated after each punch of the strip-shaped material to circumferentially offset the second punched-out arc-shaped core pieces relative to the first punched-out arc-shaped core pieces.

16. The method for manufacturing the annular-shaped laminated rotor core according to claim 9, wherein each of the first and second punched-out arc-shaped core pieced includes a magnet installation through hole configured to accommodate a magnet, a sleeve installation through hole configured to install a sleeve, and an embossed portion, the method further comprising fitting the embossed portion on a surface of one of the second punched-out arc-shaped core pieces into the embossed portion on a surface of the first punched-out arc-shaped core piece which is adjacent the second punched-out arc-shaped core piece in the laminating direction.

\* \* \* \* \*